March 20, 1962    E. J. RUOF    3,026,148
ADAPTIVE BRAKE PRESSURE CONTROL
Filed March 21, 1961    2 Sheets-Sheet 1

INVENTOR.
EDGAR J. RUOF
BY
J. B. Holden
ATTORNEY

March 20, 1962     E. J. RUOF     3,026,148
ADAPTIVE BRAKE PRESSURE CONTROL
Filed March 21, 1961     2 Sheets-Sheet 2

*INVENTOR.*
EDGAR J. RUOF
BY
J. B. Holden
ATTORNEY

United States Patent Office 3,026,148
Patented Mar. 20, 1962

3,026,148
ADAPTIVE BRAKE PRESSURE CONTROL
Edgar J. Ruof, Akron, Ohio, assignor to The Goodyear Tire & Rubber Company, Akron, Ohio, a corporation of Ohio
Filed Mar. 21, 1961, Ser. No. 97,370
11 Claims. (Cl. 303—21)

This invention relates to apparatus for controlling the pressure applied to the wheel brakes of a hydraulic brake system to prevent application of such pressure as would cause the wheel to skid. The invention may be advantageously employed in any hydraulic brake system having a metering control valve operated by an operator whether or not anti-skid means are incorporated in the system or not. It is particularly useful in connection with airplane brakes, although it may be used on other vehicles.

Heretofore it has been the practice to equip the landing wheels of airplanes with operating cylinders supplied by fluid under pressure from a suitable pressure supply, the fluid being supplied by a metering valve controlled by the pilot, the metering valve being of such construction that the greater the pressure supplied by the pilot at the metering valve, the greater the braking pressure at the wheel. Such a system has had the disadvantage that when the pilot exerts too much pressure on the metering valve, the wheel becomes locked and skidding occurs.

It has been proposed, as in U.S. Patent No. 2,753,017 and U.S. Patent No. 2,799,462 to provide a solenoid valve in the pressure supply line to the brake cylinder in association with electrical apparatus controlled by a wheel driven generator for operating the solenoid valve to release the brake pressure whenever deceleration of the wheel at a rapid rate indicated the existence of skidding conditions, or the approach of such conditions. While such apparatus has been highly successful, its solenoid valve is either in an off position where the pilot has no control over braking, as during a skid condition, or it is in an on position where the pilot has full control but may possibly apply too great a pressure to the brake.

The present invention has for an object to supply mechanism which may, for example, be applied to an airplane hydraulic brake system whether equipped with anti-skid mechanism, or not, and which will sense variations in wheel velocity of a braked wheel and will control thereby the possible pressure which can be applied to the brake so that highly efficient braking is made possible with absence of over braking.

Another object of the invention is to provide a hydraulic brake control which provides a shorter, smoother stop than prior types of similar apparatus, and which does not stress the control and brake means as severely as prior types of similar apparatus.

A further object is to supply such mechanism to an existing brake system without changes in the previous system except for installation of an additional brake pressure control valve in the pressure supply line at the brake cylinder.

Another object of the invention is to furnish a brake control, where a continuing, instantaneously operating control reflecting the braked wheel speed for gradual changes in the braking action is provided.

The foregoing and other objects which will become apparent as this description proceeds are accomplished by providing, in the pressure supply line to the brake cylinder from a pilot operated metering valve which delivers a pressure proportional to applied force, a pressure control valve in which the output pressure to the brake cylinder is a function of the electrical control current, providing a wheel driven velocity detector in the form of a D.C. generator whose output voltage is directly proportional to the wheel speed of the wheel to be braked, providing means for detecting acceleration from the generator voltage, amplifying the detector output to provide current for operating the pressure control valve, providing for detecting variations in the valve operating current, and providing for bleeding off small variations of the current and voltage at the variation and acceleration detectors through a variable bleeder to remove variations below skid level to prevent them from effecting the pressure control valve.

For a better understanding of the invention, reference is made to the following drawings forming a part hereof. In the drawings.

Figure 1:
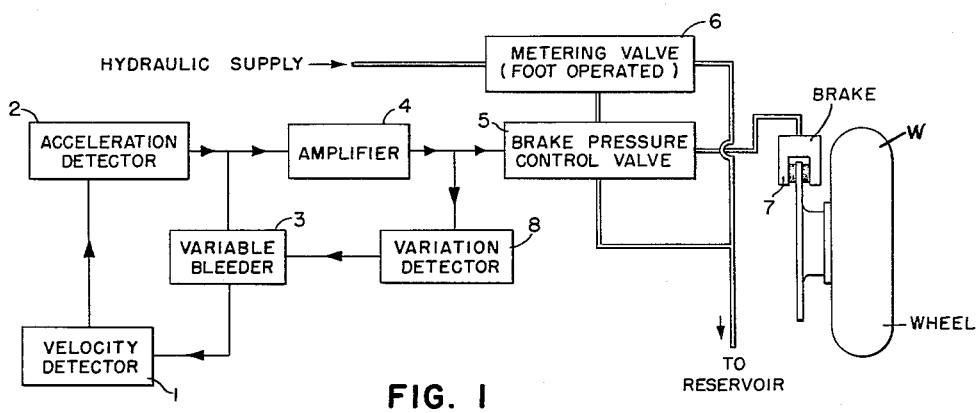
FIG. 1 is a block diagram of apparatus embodying the principles of the invention.

Referring first to FIG. 1, the numeral 1 designates a velocity detector in the form of a D.C. generator directly driven by the wheel W to be braked and whose output voltage is directly proportional to the wheel speed and follows the wheel speed so closely that even short duration low-amplitude changes in voltage are representative of corresponding changes in wheel speed. Any change in wheel speed is considered to be an acceleration. The numeral 2 designates an acceleration detector, including a capacitor, the output current of which is a measure of slowing of the wheel. Normal slowing of the wheel produces a useful capacitor discharge current from the acceleration detector, but such low current is usually allowed to escape through a variable bleeder 3. When there is a sudden wheel slowing indicating a tendency to skid, there is a sudden change in generator voltage and this results in a sudden increase in current from the acceleration detector 2. A part of this current is delivered to an amplifier 4 which delivers an amplified output to a solenoid operated brake pressure control valve 5. This valve is mounted in series with a pilot-operated metering valve 6 between the metering valve and the brake 7. The brake 7 is mounted to engage the wheel on which the generator 1 is located and pressure to it would ordinarily be supplied to it by the metering valve 6 in proportion to pressure applied thereto by the pilot.

The brake pressure control valve 5 is of the type in which the output pressure is a function of the electrical control current in the valve operating circuit and which may include a member, such as a solenoid therein. With this valve, if the input pressure is constant, the output pressure decreases almost linearly as the input current increases and when the input pressure changes, the output pressure changes almost linearly in the same direction. When a tendency to skid appears, a sudden increase in current from the acceleration detector 2 occurs which causes the pressure control valve to reduce the pressure supplied to the brake and thereby relieves the tendency to skid. When no control current appears at the pressure control valve, the valve does not interfere with the normal operation of the metering valve 6.

It is desired that current produced by normal variations in wheel speed, indicating less deceleration, or negative acceleration, than would occur when skidding occurs, have no operative effect upon the pressure control valve 5. To bleed off such variations, a variation detector 8, controlled by the current output of amplifier 4, is employed to control the bleeder 3 to bleed off such current variations from the acceleration detector.

The output of the amplifier 4 to the brake pressure valve 5 is monitored by the variation detector 8. The variation detector 8 senses abrupt increases in the current to the pressure control valve and acts instantaneously to reduce the current through the variable bleeder 3, or to prevent any increase in such current. This, of course, under negative acceleration conditions, causes a greater percentage of the current from the acceleration detector 2 to go to the amplifier 4, which may cause a still further reduction in brake pressure if there is a continual tendency to skid. If there is no continued tendency to skid, the reduction of current through the variable bleeder 3 will result in a slight sustained current through the valve 5. Since any current through the valve 5 produces a corresponding reduction in brake pressure and relieves the tendency to skid, the brake pressure will then be slightly less than that which produced the original tendency to skid. The degree of intensity of the tendency to skid governs the amount of the reduction in brake pressure, so that only slight tendency to skid brings on comparatively slight reduction to brake pressure, whereas severe skidding conditions result in the complete dump, or release of brake pressure for the duration of the skid.

The variable bleeder 3 is so designed that successive increases in the current from the amplifier 4 to the brake pressure control valve 5 cause successive increases in the pinch-off effect of the variable detector 8 on the variable bleeder 3 and thus upon the current from the acceleration detector 2 to permit greater current flow to the valve 5. Such action continues to relieve the braking pressure by increments to endeavor to maintain some brake pressure but not to permit the wheel W to go into a skid. Actually there cannot be very many increases in current from the amplifier 4 as the first pulse of current effects a braking force reduction and the rate of negative acceleration is reduced by such first pulse. The variable bleeder 3, as previously indicated, will bleed off normal current from the acceleration detector 2 but it becomes what might be termed saturated so that excess current from the acceleration detector flows to the amplifier 4. When abrupt changes in current to the brake pressure control valve 5 no longer occur, the variation detector 8 slowly reduces its pinch-off effect on the variable bleeder 3 so that an ever decreasing proportion of the current from the acceleration detector is allowed to go to the amplifier 4. This permits the brake pressure to gradually increase, and if the resulting brake pressure results in another tendency to skid, it merely results in another similar series of events.

Figure 2:
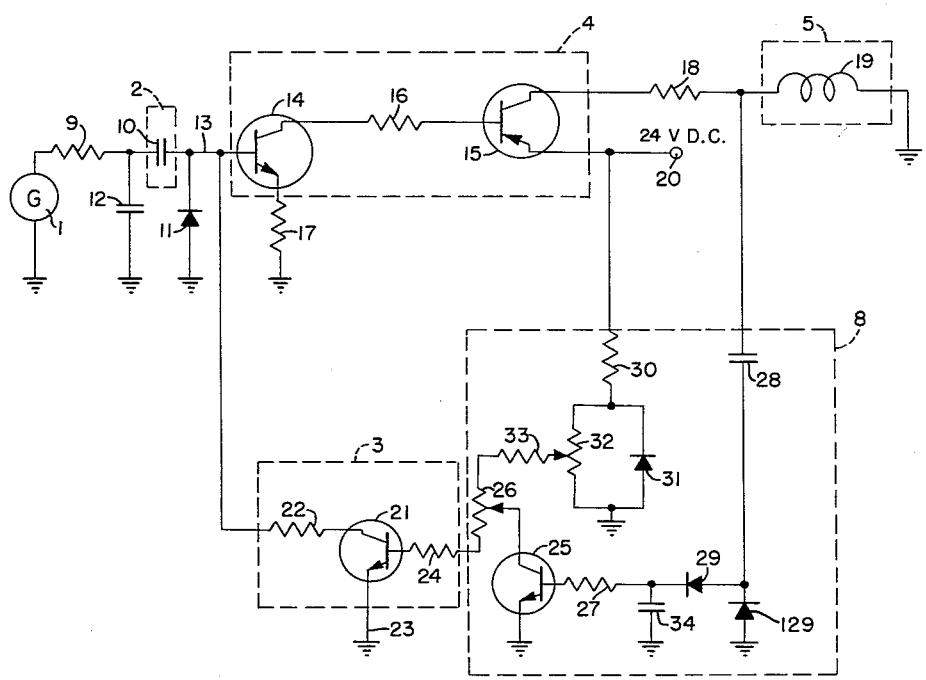
FIG. 2 is a schematic electrical diagram of the control apparatus.

The schematic electrical diagram of one example of the apparatus of the invention is shown in FIG. 2. It will be appreciated that the specific apparatus shown comprises one typical circuit used to perform the functions and controls of the apparatus of the block diagram. The various transistors, resistances, capacitors and the like in the specific circuit and the connections thereof obviously may be varied in sensitivity, in connections and in ratings for different control applications, the amplification required, the sensitivity needed etc. Equivalent members, or circuits to those shown may be substituted, when desired. Furthermore, the functions of the variable bleeder 3 and variation detector 8 may be combined in one unit connected across the amplifier 4. The wheel driven generator 1, which acts as a velocity detector is in series with a resistor 9, a capacitor 10, which is the acceleration detector, and a junction diode 11. A filter capacitor 12, for smoothing the generator output, is shunted across the generator and resistor 9. The charge on the capacitor 10 is delivered to the amplifier 4 through line 13.

The amplifier 4 is a two-stage transistorized amplifier including transistors 14 and 15. Line 13 is connected to the base of the transistor 14, the collector of which is coupled to the base of the transistor 15 by a resistor 16, and the emitter of which is grounded through a resistor 17. The output of the transistor 15 is delivered from its collector element through a resistor 18 to a solenoid 19 and through the solenoid to ground. The emitter element of the transistor 15 is connected to a 24 D.C. volt supply 20.

The variable bleeder 3 comprises a transistor 21 the collector of which is connected to the line 13 through a resistor 22, the emitter of which is connected to ground by a line 23, and the base of which is biased through a resistor 24 by the variation detector 8.

The variation detector 8 includes a transistor 25 the collector of which is coupled to the base of the transistor 21 through a potentiometer 26 and the resistance 24, and whose emitter is grounded. The base of the transistor 25 is biased through a resistor 27. Sensing of variation in current supplied at the brake pressure control valve 5 is provided by a capacitor 28 having one pole connected to the line between the resistor 18 and the solenoid of the valve 5, and having its opposite pole connected to the base of the transistor 25, through a junction diode 29. The bias on the transistor 25 is adjustable and for this purpose a resistor 30 connects the 24 volt supply 20 to ground through a voltage regulator such as a Zener diode 31. A potentiometer 32 is connected in parallel with the Zener diode 31, which maintains the voltage across the potentiometer 32 constant, for example, at about 7.5 volts even though the supply voltage varies from about 18 to 30 volts. The sliding contact of the potentiometer 32 is connected to the collector of the transistor 25 through a resistor 33 and the potentiometer 26 for varying the bias on the collector. A by-pass capacitor 34 is connected from the resistor 27 to ground, and another junction diode 129 connects from ground to the capacitor 28 and diode 29. By adjusting the potentiometers 26 and 32, the sensitivity of the variation detector may be adjusted.

The capacitor 28, junction diodes 29 and 129 and condenser 34 form a pump circuit and normally the capacitors 28 and 34 are of equal value. In this circuit, each pulse of current flowing to the solenoid 19 for the valve 5 provides an increased potential on the capacitor 34. The potential of the capacitor 34 does not remain constant, however, between pulses as it discharges slightly through the resistor 27 and transistor 25. Even without square wave D.C. pulses, the pump action increases the voltage on the capacitor 34 each time a substantial voltage appears across the solenoid 19. Increases in the voltage on the capacitor 34 in turn produce successive increases in the pinch off effect of the variable bleeder 3 by changing the bias on the base of the transistor 21.

It will be seen that the various diodes in the circuit of FIG. 2 permit current flow only in the direction indicated.

Figure 3:
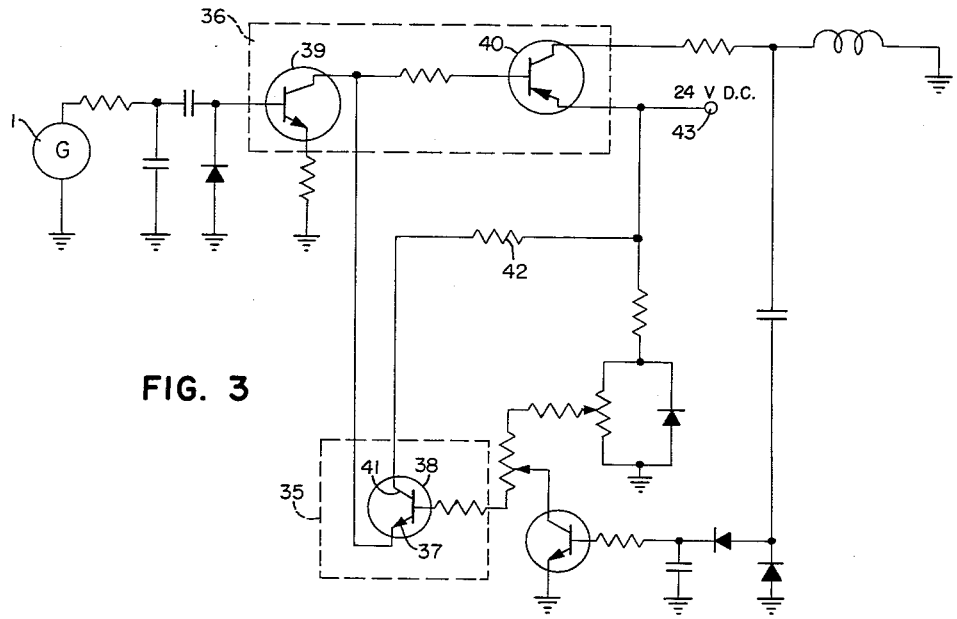
FIGS. 3 and 4 are diagrams of modified control apparatus of the invention.

FIG. 3 shows a circuit similar to FIG. 2 but wherein a slightly different connection is provided between a variable bleeder 35 provided in the circuit, and the amplifier 36. In this instance, the emitter 37 of the transistor 38 is connected to the lead extending between transistors 39 and 40 in the amplifier, while the collector 41 of the transistor 38 connects through a resistance 42 to a source of direct current, such as 24 volts direct current indicated at 43. However, in general, this circuit is connected in substantially the same manner as that shown in FIG. 2, and it functions for control action in the same manner as described hereinabove.

Figure 4:
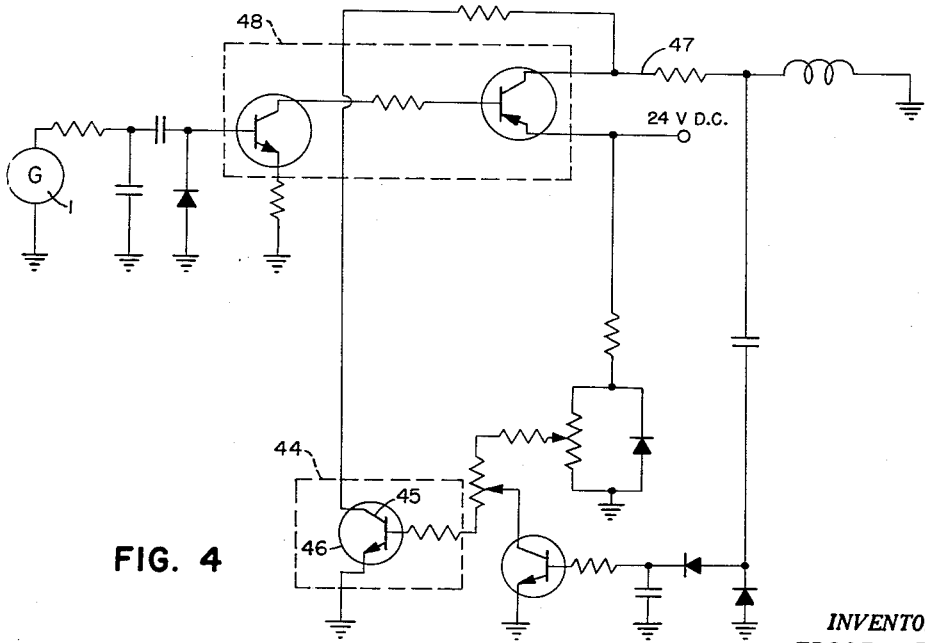

FIG. 4 shows that the sensitization of the variable bleeder may come from the output of the amplifier provided in the circuit, and hence a variation bleeder 44 is shown which has a collector 45 of a transistor 46 connected to an output lead 47 of the amplifier 48 in this particular circuit. The emitter of the transistor 46 connects to the ground, or common potential point to which other leads in the circuit are likewise connected, as indicated.

The ground indicators in the circuits refer to points at common potential.

From the various circuits of the invention disclosed herein, it will be seen that a very effective control action is provided for the braking forces supplied to the novel solenoid control valve used in association with the metering valve in the braking system for delicate, continuing, automatic control of the actual braking pressure permitted through the braking system. It will be realized that the brake action is normally power operated and that the variations in voltage produced on the acceleration detectors in the control circuits of the invention will instantaneously, in effect, record changes in the wheel speed in the braking system through the solenoid valve 5 so as to prevent skid conditions from being reached, but yet to permit maximum continuing braking pressures.

In view of the foregoing, it is believed that the objects of the invention have been achieved.

While certain representative embodiments and details have been shown for the purpose of illustrating the invention, it will be apparent to those skilled in the art that various changes and modifications may be made therein without departing from the spirit or scope of the invention.

I claim:

1. An adaptive brake pressure control for controlling the pressure of fluid to a fluid operated brake from a manually operated metered supply, said pressure control comprising an electrically operated pressure control valve having an operating circuit and whose output pressure is a function of the electric current supply to its operating circuit, and a control circuit for said pressure control valve comprising a velocity detector driven by the wheel to be braked and having an electrical power output, an acceleration detector connected to the output of said velocity detector, an amplifier for amplifying the output of said acceleration detector and providing an output current for energizing the operating circuit of said pressure control valve, a variation detector connected to the output of said amplifier for sensing abrupt increases in the current supply to said operating circuit for said pressure control valve, and a variable bleeder connected to the output of the acceleration detector and to said variation detector for control thereby for reducing the current through said bleeder and increasing the current to said operating circuit when such abrupt increases of current occur.

2. An adaptive brake pressure control for controlling the pressure of fluid to a fluid operated brake from a manually operated metered supply, said pressure control comprising an electrically operated pressure control valve having an operating circuit and whose output pressure is a function of the electric current supply to its operating circuit, and a control circuit for said pressure control valve comprising a velocity detector driven by the wheel to be braked and having an electrical power output, an acceleration detector connected to the output of said velocity detector, an amplifier for amplifying the output of said acceleration detector and providing an output current connected to the operating circuit of said pressure control valve for energizing it, a variation detector connected to the output of said amplifier in parallel with said operating circuit for sensing abrupt increases in the current supply to said pressure control valve, and a variable bleeder also connected to the output of the acceleration detector and to said velocity detector for normal current flow therebetween, said variation detector also being connected to said variable bleeder to control the action thereof and for controlling the current through said variable bleeder and increasing the current to said amplifier when such abrupt increases of current occur.

3. An adaptive brake pressure control for controlling the pressure of fluid to a fluid operated brake from a manually operated metered supply, said pressure control comprising an electrically operated pressure control valve having an operating circuit and whose output pressure is a function of the electric current supply to its operating circuit, and a control circuit for said pressure control valve comprising a velocity detector driven by the wheel to be braked and having an electrical power output, an acceleration detector connected to the output of said velocity detector, an amplifier for amplifying the output of said acceleration detector and providing an output current for energizing the operating circuit of said pressure control valve, and a variation detector and variable bleeder means connected across said amplifier for sensing abrupt increases in the current supply to said operating circuit for said pressure control valve, said variation detector and variable bleeder means being adapted to bleed off restricted amounts of current from said acceleration detector but to permit increased current flow to said operating circuit when such abrupt increases of current occur.

4. In combination in an adaptive brake pressure control for controlling the pressure of fluid to a fluid operated brake from a manually operated metered supply, said pressure control comprising an electrically operated pressure control valve having an operating circuit and whose output pressure is a function of the electric current supply to its operating circuit, a velocity detector driven by the wheel to be braked and having an electrical power output, a condenser connected to the output of said velocity detector for charging action thereby, means connected in the circuit of said velocity detector and said condenser to prevent discharge of said condenser to said velocity detector, an amplifier for amplifying the output of said acceleration detector and providing an output current supplied to the operating circuit of said pressure control valve to energize it, a variation detector connected to the output of said amplifier for sensing abrupt increases in the current supply to said operating circuit for said pressure control valve, and a bleeder circuit means connected to the output of the acceleration detector for normally bleeding limited currents therefrom away from said amplifier, said variation detector being connected to said bleeder circuit means to reduce the current therethrough and increase the current to said amplifier and operating circuit when such abrupt increases of current occur.

5. An adaptive brake pressure control for controlling the pressure of fluid to a fluid operated brake from a manually actuated metered supply, said pressure control comprising an electrically operated pressure control valve having an operating circuit and whose output pressure is a function of the electric current supply to its operating circuit, and a control circuit for said pressure control valve comprising a velocity detector driven by the wheel to be braked and having an electrical power output, an acceleration detector connected to the output of said velocity detector, an amplifier for amplifying the output of said acceleration detector and providing an output current for energizing the operating circuit of said pressure control valve, a D.C. power source connected to said amplifier, a variation detector connected to said power source and receiving a current proportional to the output of said amplifier for sensing abrupt increases in the current supply to said operating circuit for said pressure control valve, and a variable bleeder receiving a current proportional to the output of the acceleration detector and to said variation detector for control thereby for reducing the current through said bleeder and increasing the current to said operating circuit when such abrupt increases of current occur.

6. An adaptive brake pressure control for controlling the pressure of fluid to a fluid operated brake from a manually actuated metered supply, said pressure control comprising an electrically operated pressure control valve having an operating circuit and whose output pressure is a function of the electric current supply to its operating circuit, said pressure control valve being connected in the braking system, and a control circuit for said pressure control valve comprising an electric generator driven by the wheel to be braked and having an electrical power output, a condenser connected to the output of said generator, an amplifier for amplifying the output of said condenser and providing an output current connected to the operating circuit of said pressure control valve for energizing it, current variation detector means connected to the output of said amplifier in parallel with said operating circuit for sensing abrupt increases in the current supply to said pressure control valve, and variable bleeder means also connected to the output of said condenser for normal current flow from said condenser to ground, said current variation detector means also being connected to said variable bleeder means to control the action thereof and the current through said variable bleeder means to increase the current to said amplifier when such abrupt increases of current occur, said variable bleeder means bleeding off normal currents from said condenser and with sudden increases in current from said condenser and reflecting sharp accelerations only of the braked wheel flowing to said amplifier.

7. An adaptive brake pressure control for controlling the pressure of fluid to a fluid operated brake from a manually actuated metered supply, said pressure control comprising an electrically operated pressure control valve having an operating circuit and whose output pressure is a function of the electric current supply to its operating circuit, said pressure control valve being connected in the braking system, and a control circuit for said pressure control valve comprising an electric generator driven by the wheel to be braked and having an electrical power output, a condenser connected to the output of said generator, an amplifier for amplifying the output of said condenser and providing an output current connected to the operating circuit of said pressure control valve for energizing it, current variation detector means connected to the output of said amplifier in parallel with said operating circuit for sensing abrupt increases in the current supply to said pressure control valve, and variable bleeder means also operatively connected to said condenser for normal current flow therefrom to ground, said current variation detector means also being connected to said variable bleeder means to control the action thereof and for increasing the current to said pressure control valve when abrupt increases of current occur.

8. A brake pressure control as in claim 5 where said variable bleeder includes a transistor the collector of which is operatively connected to the acceleration detector and the emitter of which is grounded, said variation detector being connected to the base of said transistor to supply a variable voltage thereto dependent upon the current supply to said operating circuit of said pressure control valve.

9. A brake pressure control as in claim 8 where said variation detector includes means therein connected to a D.C. power source to supply a fixed reference voltage to the base of said transistor, pump circuit means connected to the output of said amplifier, and a transistor connecting said pump circuit means to said base of said first named transistor to vary the bias thereon.

10. An adaptive brake pressure control for controlling the pressure of fluid to a fluid operated brake, an electrically operated pressure control valve having an operating circuit whose output pressure is a function of the electric current supply to its operating circuit, and a control circuit for said pressure control valve comprising a velocity detector driven by the rotary member being braked and having an electrical power output, an acceleration detector connected to the output of said velocity detector, an amplifier for amplifying the output of said acceleration detector and providing an output current for energizing the operating circuit of said pressure control valve, a variation detector connected to the output of said amplifier for sensing abrupt changes in the current supply to said operating circuit for said pressure control valve, and a variable bleeder connected to the output of the acceleration detector and to said variation detector for control thereby for changing the amount of current flow through said bleeder and thereby changing the amount of current flow to said operating circuit.

11. An adaptive brake pressure control for controlling the pressure of fluid to a fluid operated brake, an electrically operated pressure control valve having an operating circuit and whose output pressure is a function of the electric current supply to its operating circuit, and a control circuit for said pressure control valve comprising a velocity detector driven by the rotary member being braked and having an electrical power output, an acceleration detector connected to the output of said velocity detector, an amplifier for amplifying the output of said acceleration detector and providing an output current for energizing the operating circuit of said pressure control valve, variable bleeder means between the acceleration detector and the amplifier to bleed off current from said acceleration detector, and control means connected between the amplifier and the pressure control valve and responsive to changes in current to the pressure control valve to feed back to the variable bleeder means to incrementally change the action of the variable bleeder means.

No references cited.